United States Patent [19]
Pollen

[11] Patent Number: 5,722,712
[45] Date of Patent: Mar. 3, 1998

[54] TRAILER DECK COVER

[76] Inventor: Randall Paul Pollen, 1237 E. 900 N., Milford, Ind. 46542

[21] Appl. No.: 582,112

[22] Filed: Jan. 2, 1996

[51] Int. Cl.$^6$ .................................................. B60P 7/02
[52] U.S. Cl. ........................ 296/100; 135/132; 135/138
[58] Field of Search .............................. 296/100, 136; 135/132, 133, 135, 136, 138, 141, 142, 148, 154, 143, 134; 160/56; 24/324, 376, 531

[56] References Cited

U.S. PATENT DOCUMENTS

| | | | |
|---|---|---|---|
| 837,531 | 12/1906 | Yeiser | 24/531 |
| 1,461,107 | 7/1923 | Barrier | 280/147 |
| 2,755,811 | 7/1956 | Murray | 135/132 |
| 2,856,942 | 10/1958 | Scott | 135/132 |
| 4,192,334 | 3/1980 | Daws | 135/135 |
| 4,402,544 | 9/1983 | Artim et al. | 296/100 |
| 5,159,947 | 11/1992 | Chuang et al. | 135/132 |
| 5,316,357 | 5/1994 | Schroeder | 296/100 |

OTHER PUBLICATIONS

Machine Design, vol. 43, p. 153, Nov. 1971.

Primary Examiner—Gary C. Hoge
Attorney, Agent, or Firm—Leo H. McCormick, Jr.

[57] ABSTRACT

A deck cover for a trailer having first and second frames which are joined to first and second brackets fixed to a deck to form a rectangular member. The first and second frames have center members which are located in pockets in a tarp. Fasteners attached to the deck engage the first and second frame to hold the first and second frames in a substantially horizontal position to form a canopy over the deck. A center frame is attached to the first and second brackets, straps connected to the first and second frames extend to the deck and hold the first and second frames with the tarp attached thereto in a vertical position to provide for easy access to place cargo on the deck.

6 Claims, 2 Drawing Sheets

TRAILER DECK COVER

This invention relates to a permanently attached deck cover for a trailer having a front section and a rear section which are rotatable from a substantially horizontal closed position to a substantially vertical open position.

In the past when it was desired to protect components or contents carried by a trailer from the environment, such components and/or contents were commonly covered by a tarp or canvas. The tarp being secured to the deck of the trailer by various tie downs. This system of protection is adequate for most general applications when the need for such protection only occurs occasionally, however, there is an inconvenience as the tarp must be handled and stored whenever the contents are removed from the trailer. In order to provide an easier system of protection, it has been suggested that only areas which are most subject to damage need be protected and as a result some components are wrapped in plastic before being placed on a trailer. For instance, when a jet ski is carried on a trailer only the bow is covered by a protective cover to prevent rocks, mud and water from scratching the housing surface. Unfortunately, when one removes the jet ski from the trailer, and this type of cover must be removed and stored before the jet ski is placed in the water.

In the present invention, a permanent cover assembly is attached to the deck of the trailer. The cover assembly includes first and second U-shaped mounting brackets which are approximately located midway between the front and rear of the deck. Each U-shaped mounting bracket has a series of corresponding openings in the side walls for receiving pivot pins associated with support frames or staves that are secured to a tarp. Each support frame has first and second legs which are connected to each other by a center member whose length is determined by the width of the deck. Each cover assembly has at least three support frames or staves, i.e. a front frame, center frame and rear frame. The front frame and the rear frame each have fastener means located adjacent a corner formed with the first and second legs. The fastener means are designed to hold the front and rear frames substantially parallel with the deck while retaining the center frame perpendicular to the deck. A flap extends from both the front and rear of the tarp to cover the junction of the tarp and the deck to prevent water, dust and other contamination in the environment from being communicated to the interior of the deck and any cargo carried thereon. A first strap is attached to each leg of the front frame and a second strap is attached to each leg of the rear frame. The first and second straps are designed to cross and be attached to the deck to permit the front and rear frames to be retained in a position substantially perpendicular to the deck to retain the tarp in an opened position. In the opened position, cargo can easily be placed on the deck while allowing easy access to either the front or rear areas of the trailer deck.

It is an object of this invention to provide a trailer with a deck cover which is permanently attached to a deck but allows for cargo to be easily placed on the deck.

It is an object of this invention to provided a light weight cover for the deck of a trailer which can withstand substantial weather conditions while protecting cargo located on the deck from the environment and any contamination associated therein.

It is a further object of this invention to disclose a method of manufacturing and attaching a cover assembly to the deck of a trailer.

These object and advantages of this invention should be apparent from reading this disclosure while viewing the attached drawings.

DETAILED DESCRIPTION OF THE INVENTION

Figure 1:
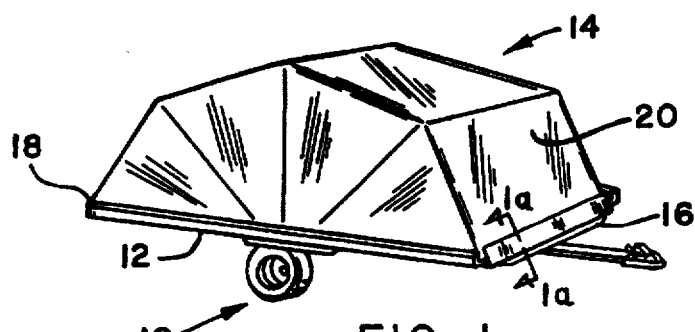
FIG. 1 is a schematic illustration of a deck cover for a trailer made according to the principals of this invention.

The trailer 10 shown in FIG. 1 has a deck 12 with a cover assembly 14 made according to the principles of this invention. The cover assembly 14 has flaps 16 and 18 which extend from the front and rear of a tarp 20 to substantially cover the joints formed between the deck 12 and the edge of the tarp 20. As can be seen, the cover assembly 14 forms a canopy which prevents the communication of water, dust, and other contamination that may be present in the atmosphere or environment from being communicated to any cargo retained on the deck 12 with the cover assembly 14 in the closed position as shown in FIG. 1.

Figure 2:
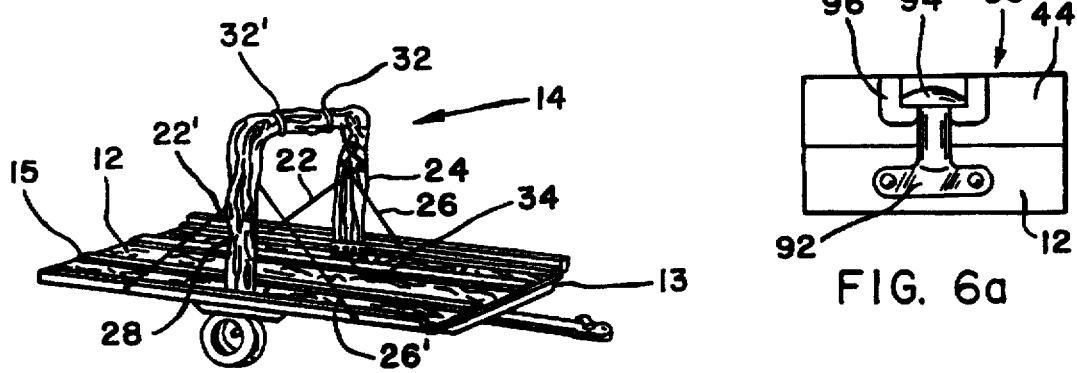
FIG. 2 is a schematic illustration of the deck cover of FIG. 1 in a fully opened position.

The cover assembly 14 is shown in FIG. 2 in the opened position to allow cargo to be placed on deck 12. The cover assembly 14 is retained in this opened position by first straps 22,22' attached to a front frame 24 and second straps 26,26' attached to a rear frame 28, all such straps thereafter being connected to the deck 12. Straps 22,22' extend past a center frame 30 toward the rear of the deck 12 while straps 26,26' extend past the center frame 30 toward the front of the deck 12 to form a cross such that in an opened position all of the frame members are approximately perpendicular to the deck 12. Further straps 32,32' are located around the tarp 20 to form a compact bundle for the cover assembly 14. With the cover assembly 14 in the opened position as shown in FIG. 2, cargo can be easily place on deck 12.

In more particular detail, the cover assembly 14 is essentially made up of a tarp 20 which is attached to a plurality of frame members, i.e. front frame 24, rear frame 28, center frame 30 and mid-support frames 27 and 29. Each frame member is pivotally secured to first and second U-shaped mounting brackets 34,34' attached to the deck 12.

Figure 4:
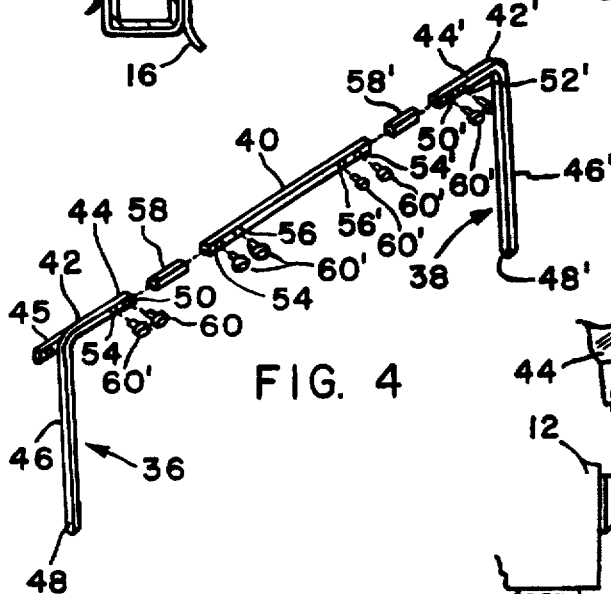
FIG. 4 is an exploded illustration of a frame member.

Each frame 24,27, 28,29 and 30 is identical and made of square tubing as shown in FIG. 4. Each frame consists of a first leg 36 and a second leg 38 which are joined together by a center member 40. Leg 36 is identical with leg 38 and each have a bow 42,42' which form right angle end sections 44,44' that respectively extend from side sections 46,46'. Side sections 46,46' have holes 48,48', respectively, located adjacent the ends thereof while end sections 44,44' have a plurality of holes 50,50',52,52' located adjacent their ends. The center member 40 also has a plurality of holes 54,54'56, 56' located on first and second ends thereof. Insert or extension support members 58,58' are located in the ends of the center member 40 and corresponding screws 60,60' extend through holes 54,54',56,56' to secure the insert or support extension members 58,58' to the center member 40. Thereafter, inserts 58,58' are located on end sections 44,44' of legs 36,38 and screws 60,60' inserted through holes 50,50',52,52' to form a frame. Inserts 58,58' are designed to permit a limited amount of tolerance in the length from leg 36 to leg 38 while assuring that legs 36 and 38 are perpendicular to center member 40. The end of leg 36 is secured to U-shaped mounting bracket 34 while the end of leg 38 is secured to U-shaped mounting bracket 34' by pins 61,61' which extend through holes 48,48', respectively.

Figure 5:
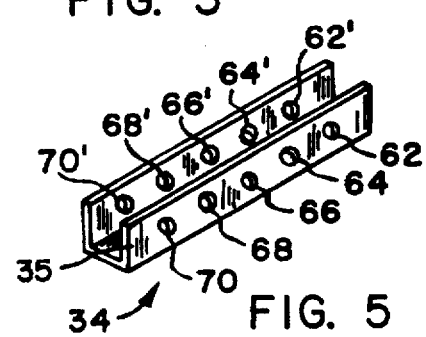
FIG. 5 is a perspective of U-shaped mounting member which is attached to the deck.

U-shaped mounting brackets 34,34' are identical and only bracket 34 is more clearly described with respect to FIG. 5. Bracket 34 has a plurality of holes 62,62',64,64',66,66',68, 68',70,70' which are located in the side walls thereof. The holes 62,62',64,64',66,66',68,68',70,70' are spaced such that in the opened position, each of the frames 24,27,28,29 and 30 may be opened to a substantially perpendicular position. The side walls of the U-shaped mounting bracket 34 and the square shaped tubing of the frame interact to form a stable joint.

Figure 7:
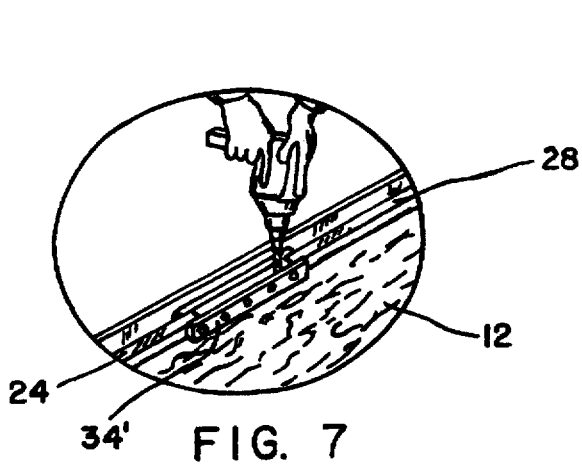
FIG. 7 is a schematic illustration showing the alignment of a mounting member of FIG. 5 with respect to the deck of the trailer.
Figure 8:
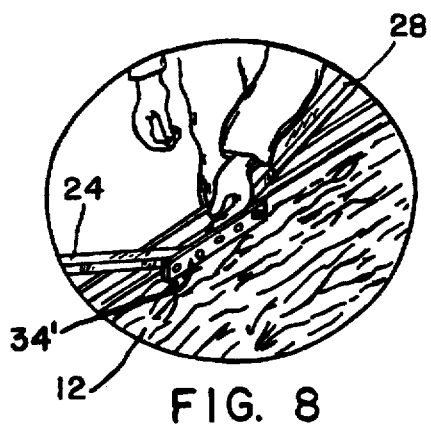
FIG. 8 is a further illustration showing the attachment of the mounting member of FIG. 7 to the deck.
Figure 9:
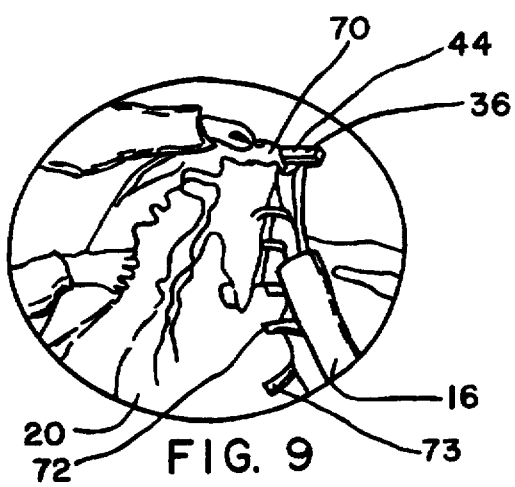
FIG. 9 is an illustration of the attachment of a side member of a frame of FIG. 4 to define an end support for the tarp of the deck cover.

Initially end frame 24 for the front and end frame 28 for the rear are attached to brackets 34,34' to form a rectangle and this arrangement is placed on deck 12. The center member 40 of the front frame 24 is aligned to the front edge 13 of the deck 12 and secured by a clamp. Thereafter, center member 40' of the rear frame 28 is aligned with the rear edge 15 of deck 12. In this position, front frame 24 and rear frame 28 are vertical and substantially parallel to deck 12 while legs 46,46' of the frames form a straight line along the edges of the deck 12. The brackets 34,34' will be aligned at approximately the center of the deck in a manner as shown in FIG. 7. Holes are thereafter drilled through holes 35, only one of which is shown in FIG. 5, in base of the U-shaped mounting bracket 34' and bolts used to fix bracket 34' to deck 12 as shown in FIG. 8. This method of attachment is repeated for bracket 34.

Figure 10:
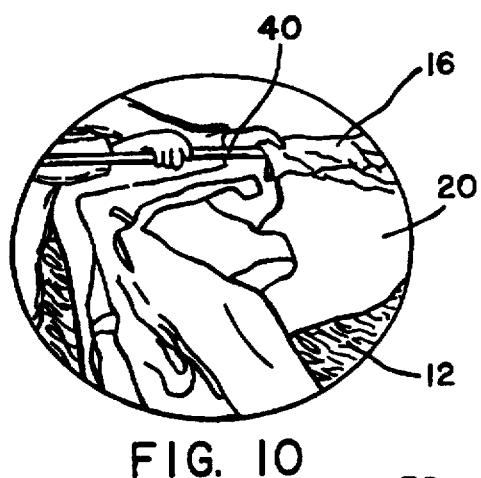
FIG. 10 is an illustration of the insertion of a center member into the tarp.
Figure 11:
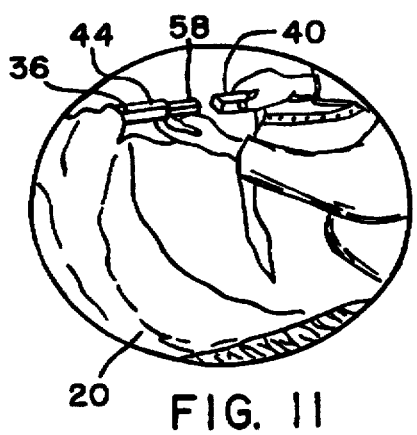
FIG. 11 is an illustration of a joint support member for connecting the center member of FIG. 10 with the side member of FIG. 9.
Figure 12:
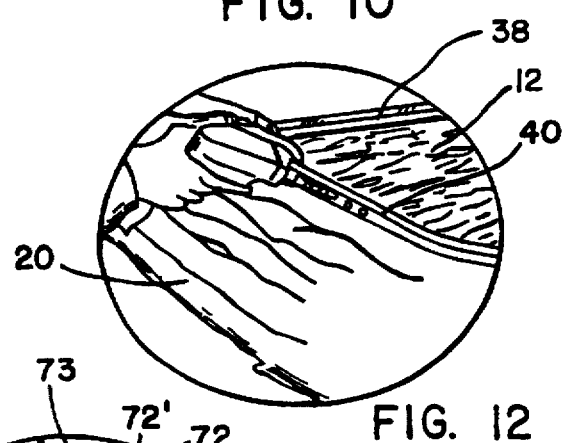
FIG. 12 is an illustration of the attachment of the side frame with the center member of FIG. 11.

After the U-shaped mounting brackets 34,34' are secured to the deck 12, it is necessary to remove the front frame 24 and rear frame 28 from the brackets 34,34' and attach them to the tarp 20. End section 44 for side members 36 is located in a side pocket and center member 40 inserted in the center pocket of the tarp 20 as shown in FIG. 10. Insert 58 is placed in the end section 44 and the center section 40, see FIG. 11, and screws 60,60' are inserted to join the leg 36 to the center section 40, see FIG. 12. This process is repeated for leg 38 to assure that a rectangular frame is created.

Figure 1A:
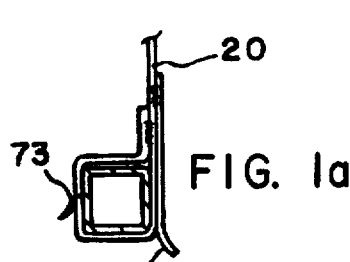
FIG. 1a is a sectional view taken along line 1a—1a of FIG. 1.
Figure 13:
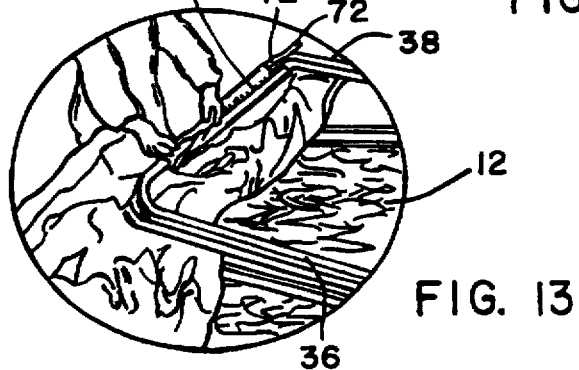
FIG. 13 is an illustration of the attachment of additional bows to the tarp to complete the assembly of the deck cover on the trailer.

As best shown in FIG. 13, the tarp 20 has a plurality of pockets 71 each of which has a closure zipper 73. After the center members 40 and legs 36 and 38 are located in the appropriate pockets, each zipper is closed. To provide for extra safety, Velcro tabs 72,72' are also added at known stress points to assure the tarp 20 is secured to the frames. Tarp 20 also has pockets 71 adjacent flaps 16 and 18 which extend along the inside edge and across the front and rear surface where the front frame 24 and rear frame 28 are designed to engage the deck see FIG. 1a. Once the tarp 20 is secured to the frames, the ends are pivotally secured to the U-shaped mounting brackets 34,34'. When the tarp 20 is fully extended, a canopy is formed over deck 12 to protect any cargo on the deck 12. In order to assure that the canopy remains extended, fastener means are secured to the corners of the front frame 24 and rear frame 28.

Figure 6A:
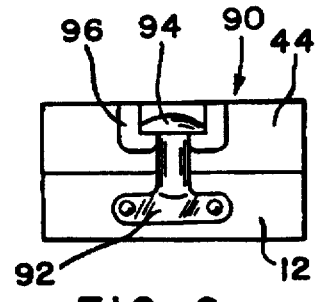
FIG. 6a is an illustration of a resilient fastener means for securing an end frame member to the deck.
Figure 6B:
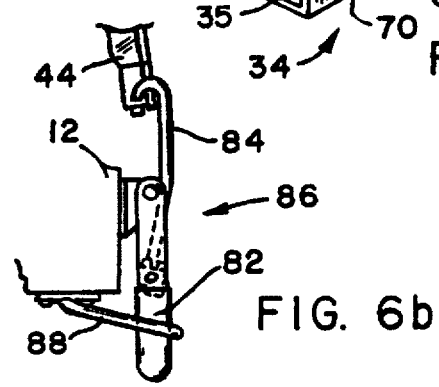
FIG. 6b is an illustration of an over the center fastener means for securing an end frame member to the deck.

Fastener means are attached to the end members 44 of the front 24 and rear 28 frames. While many type of fastener means may be acceptable, for simplicity a resilient member 90 as shown in FIG. 6a and an over center member 86 as shown in FIG. 6b have proven to be adequate for to maintain the tarp in a closed position. Under testing, when fastener means were located on the corners the deck cover assembly 14 was sufficient to withstand forces experience at 60 mph however it may be desirable to add a center fastener under some circumstances.

The resilient member 90 as illustrated in FIG. 6a consists of a T-shaped member having a first end 92 attached to deck 12 and a second end 94 which is retained in a yoke 96 attached to and extending from end member 44. End 94 is easily inserted in yoke 96 and when attached thereto forms a resilient joint which holds end member tight against the deck 12 to prevent water, dirt or other contamination carried by the air from being communicated to cargo carried on the deck 12.

An over center member 86 as illustrated in FIG. 6b consists of a lever 82 and a hook 84. Hook 84 is located in a holes 45,45' in projections extending from to section 44 of the legs 36 and 38 while the lever 82 is attached to the edge of the deck 12. The lever 82 is designed to securely lock the frame to the deck 12 while at the same time being protected from the surrounding environment by flaps 16 and 18 that extend from the tarp 20. In addition, a resilient strap 88 attached to deck 12 is designed to engage and hold the end of lever 82 to assure that the lever 82 does not pivot about center and allow hook 84 to be removed from section 44 once it is closed.

Figure 3:
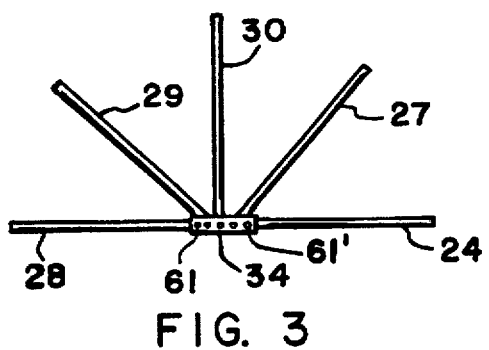
FIG. 3 is a side view of the frame members to which a trap is attached to define the deck cover of FIG. 1.

As shown in FIG. 3, the frame includes two intermediate support frames 27 and 29 which are designed to be secured to the tarp 20 to provide for additional support of the tarp 20 such that the shape shown in FIG. 1 is maintained during while pulling the trailer 10 however this number could be increased it necessary by making the U-Shaped mounting bracket 34,34' longer such that all the frames are retained in a substantially parallel and perpendicular position with respect to the deck 12 in an opened position.

I claim:

1. A deck cover for a trailer comprising:
   first and second U-shaped brackets fixed to a deck of the trailer;
   a first frame having first and second side legs joined together with a center member, said first leg being connected to said first U-shaped bracket and said second leg being secured to said second U-shaped bracket;
   a second frame having first and second side legs joined together with a center member, said first leg being connected to said first U-shaped bracket and said second leg being secured to said second U-shaped bracket, said first and second frames and said first and second U-shaped brackets defining a rectangle when positioned in a horizontal position on said deck;

a third frame having first and second side legs joined together with a center member, said first leg being connect to said first U-shaped bracket and said second leg being connected to said second U-shaped bracket;

a tarp having a first pocket located along a front edge, a second pocket located along a rear edge and a third pocket located at substantially a midpoint between the first and second pockets, said first pocket having a first flap and said second pocket having a second flap, zipper means associated with first, second and third pockets whereby said center member of said first frame is easily positioned in said first pocket, said center member of said second frame is easily positioned in said second pocket, said center member of said third frame is easily positioned in said third pocket to secure the tarp to said first, second and third frames;

tab means having first and second strips connected to said tarp which are joined together to reinforce and assist said zipper means in retaining said center members in said first, second and third pockets;

first and second straps attached to said first and second frames, said first and second straps being connected to said deck to hold said first, second and third frames with the tarp attached thereto in a vertical position with respect to said deck and allow easy access to said deck; and fastener means for connecting first and second projections extending from said center members of said first and second frames to said deck for maintaining said first and second frames in a horizontal position to form a canopy over said deck and protect any cargo carried by the trailer, said first and second flaps extending from said tarp to protect said fastener means from the environment.

2. The deck cover as recited in claim 1 wherein said first, second and third frame member each include inserts located between the side legs and center member to assure that a rectangular frame is created between the side legs, center member and deck.

3. The deck cover as recited in claim 1 wherein said fastener means include:

resilient members connected to said deck; and yokes attached to the first and section frames, said resilient member holding the first and second frames in a substantially horizontal position with respect to said deck when the cover is in a closed position.

4. The deck cover as recited in claim 1 wherein said fastener means include:

levers attached to the deck; and hooks extending from said levers, said hooks engaging said first and second frames and said lever being rotated past center to hold the first and second frames in a substantially horizontal position with respect to said deck when the cover is in a closed position.

5. The deck cover as recited in claim 4 wherein said fastener means further includes:

a strap attached to said deck and designed to engage said lever to assure that the lever remains in a closed position.

6. The deck cover as recited in claim 1 further including:

a plurality of additional frames sufficient to define a canopy to cover said deck while exposed to wind forces.

* * * * *